US011636282B2

(12) United States Patent
Trim et al.

(10) Patent No.: US 11,636,282 B2
(45) Date of Patent: Apr. 25, 2023

(54) MACHINE LEARNED HISTORICALLY ACCURATE TEMPORAL CLASSIFICATION OF OBJECTS

(71) Applicant: International Business Machines Corporation, Armonk, NY (US)

(72) Inventors: Craig M. Trim, Ventura, CA (US);
Michael Bender, Rye Brook, NY (US);
Martin G. Keen, Cary, NC (US);
Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 16/455,969

(22) Filed: Jun. 28, 2019

(65) Prior Publication Data
US 2020/0410292 A1    Dec. 31, 2020

(51) Int. Cl.
*G06K 9/62* (2022.01)
*G06N 20/00* (2019.01)
(Continued)

(52) U.S. Cl.
CPC .......... *G06K 9/6257* (2013.01); *G06K 9/6218* (2013.01); *G06K 9/6228* (2013.01); *G06K 9/6264* (2013.01); *G06N 20/00* (2019.01)

(58) Field of Classification Search
None
See application file for complete search history.

(56) References Cited

U.S. PATENT DOCUMENTS 11,120,364 B1 *   9/2021   Gokalp ................ G06N 20/00
2008/0270118 A1 * 10/2008   Kuo ..................... G06F 40/129
                                                            704/9
(Continued)

FOREIGN PATENT DOCUMENTS

CN       103264605        8/2013
CN       103942821 A      7/2014
(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Mohammed Rachedine
(74) *Attorney, Agent, or Firm* — Michael A. Petrocelli, Esq.; Rachel L. Pearlman, Esq.; Heslin Rothenberg Farley & Mesiti P.C.

(57) ABSTRACT

A method, computer program product, and a system where a processor(s) ingests content from a source(s) with an attribute(s) comprising a verified temporal context(s) of the source(s). The processor(s) cognitively analyzes the content, by applying an entity recognition algorithm(s) to identify and extract entities in the source(s). The processor(s) classifies each extracted entity into a given grouping from a plurality of groupings based on at least one attribute comprising the verified temporal context of the source from which the extracted entity was extracted. The processor(s) generates a corpus comprising the groupings; each grouping comprises extracted entities with verified temporal contexts consistent with a defined time period.

20 Claims, 7 Drawing Sheets

(51) Int. Cl.
*G06V 10/764* (2022.01)
*G06F 40/30* (2020.01)
*G06N 3/04* (2006.01)
*G06N 3/08* (2006.01)
*G06V 10/82* (2022.01)

(56) References Cited

U.S. PATENT DOCUMENTS

| | | |
|---|---|---|
| 2010/0277774 A1 | 11/2010 | Reid et al. |
| 2013/0249902 A1 | 9/2013 | Byrne et al. |
| 2015/0294590 A1* | 10/2015 | Kullok ................... G09B 19/00 434/236 |
| 2017/0104785 A1* | 4/2017 | Stolfo ................... G06F 40/295 |
| 2017/0124894 A1* | 5/2017 | Essafi .................. G09B 19/025 |
| 2018/0032259 A1* | 2/2018 | Yook ........................ G06F 3/048 |
| 2019/0004698 A1* | 1/2019 | Harrison ............. G06F 3/04883 |

FOREIGN PATENT DOCUMENTS

| | | | | |
|---|---|---|---|---|
| CN | 108257062 A | | 7/2018 | |
| CN | 111402887 A | * | 7/2020 | |
| CN | 112437956 A | * | 3/2021 | ............... G06N 3/08 |
| WO | WO-0118636 A1 | * | 3/2001 | ............. G06F 21/33 |

OTHER PUBLICATIONS

Xiao et al., "SUN Database: Exploring a Large Collection of Scene Categories", Published online Aug. 13, 2014, 20 pages.

* cited by examiner

MACHINE LEARNED HISTORICALLY ACCURATE TEMPORAL CLASSIFICATION OF OBJECTS

BACKGROUND

Various cognitive algorithms or machine learning algorithms comprise classifiers, meaning that they classify records (data, metadata, objects, etc.) into groups, based on relationships between data elements in the metadata from the records. In some embodiments of the present invention, the program code can utilize the frequency of occurrences of features in mutual information to identify and filter out false positives. In general, program code utilizes a classifier to create a boundary between data of a first quality data of a second quality. As a classifier is continuously utilized, its accuracy can increase as testing the classifier tunes its accuracy. When training a classifier, program code feeds a pre-existing feature set describing features of metadata and/or data in the one or more cognitive analysis algorithms that are being trained. The program code trains the classifier to classify records based on the presence or absence of a given condition, which is known before the tuning. The presence or absence of the condition is not noted explicitly in the records of the data set. When classifying a source as providing data of a given condition (based on the metadata), utilizing the classifier, the program code can indicate a probability of a given condition with a rating on a scale, for example, between 0 and 1, where 1 would indicate a definitive presence. The classifications need not be binary and can also be values in an established scale.

SUMMARY

Shortcomings of the prior art are overcome and additional advantages are provided through the provision of a method for temporal object classification and verification. The method includes, for instance: ingesting, by one or more processors, content from one or more sources of content and, for each source of the one or more sources of the content, one or more attributes comprising a verified temporal context of the source; cognitively analyzing, by the one or more processors, the content, by applying one or more entity recognition algorithm, to the content, to identify and extract entities in each source; classifying, by the one or more processors, each extracted entity of the extracted entities in a given grouping of a plurality of groupings, wherein for each extracted entity, the classifying is based on at least one attribute of the one or more attributes comprising the verified temporal context of the source from which the extracted entity was extracted; and generating, by the one or more processors, a corpus comprising the plurality of groupings, wherein each grouping of the plurality of groupings in the corpus comprises extracted entities with verified temporal contexts consistent with a defined time period.

Shortcomings of the prior art are overcome and additional advantages are provided through the provision of a computer program product for temporal object classification and verification. The computer program product comprises a storage medium readable by a processing circuit and storing instructions for execution by the processing circuit for performing a method. The method includes, for instance: ingesting, by one or more processors, content from one or more sources of content and, for each source of the one or more sources of the content, one or more attributes comprising a verified temporal context of the source; cognitively analyzing, by the one or more processors, the content, by applying one or more entity recognition algorithm, to the content, to identify and extract entities in each source; classifying, by the one or more processors, each extracted entity of the extracted entities in a given grouping of a plurality of groupings, wherein for each extracted entity, the classifying is based on at least one attribute of the one or more attributes comprising the verified temporal context of the source from which the extracted entity was extracted; and generating, by the one or more processors, a corpus comprising the plurality of groupings, wherein each grouping of the plurality of groupings in the corpus comprises extracted entities with verified temporal contexts consistent with a defined time period.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
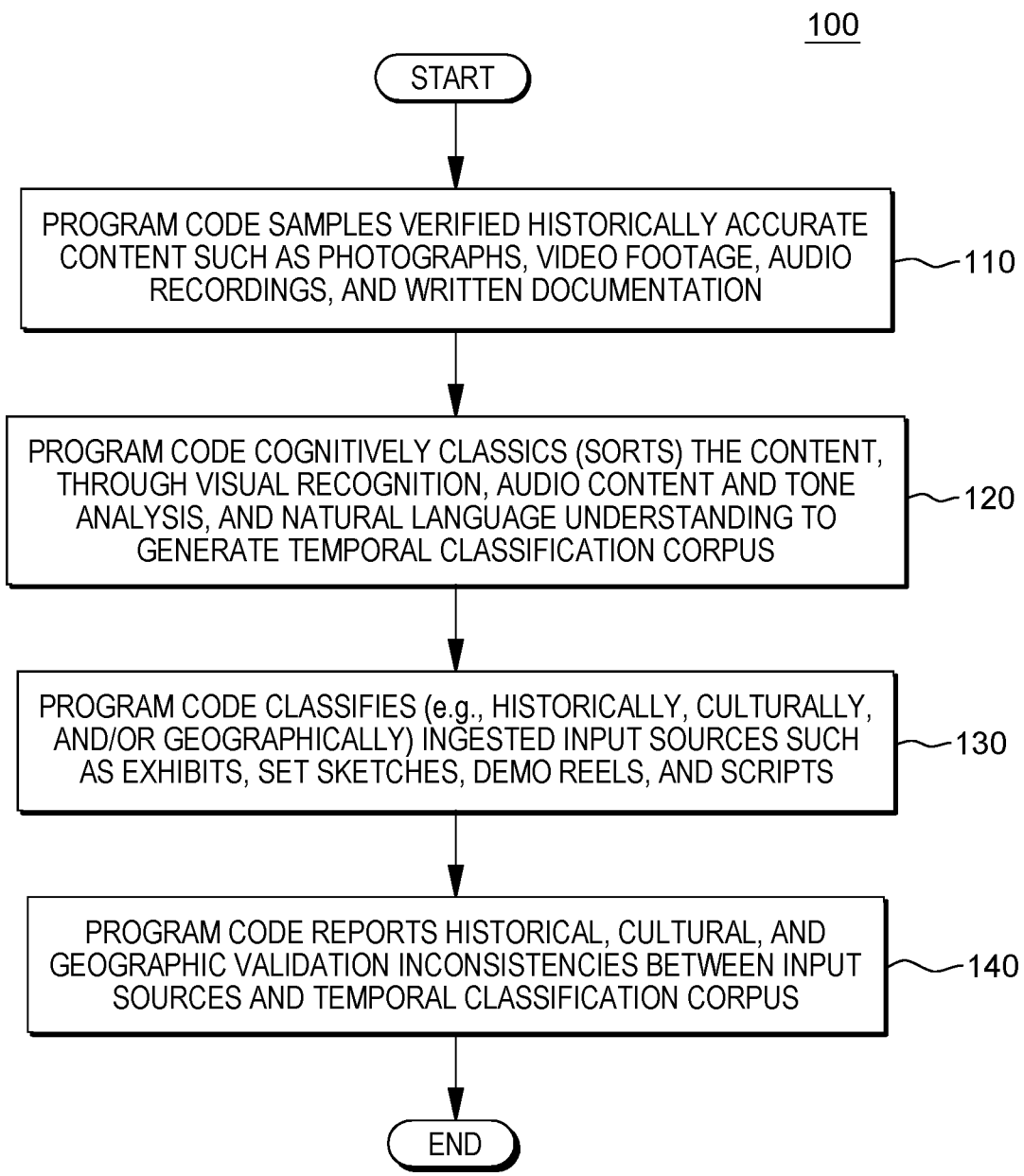
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
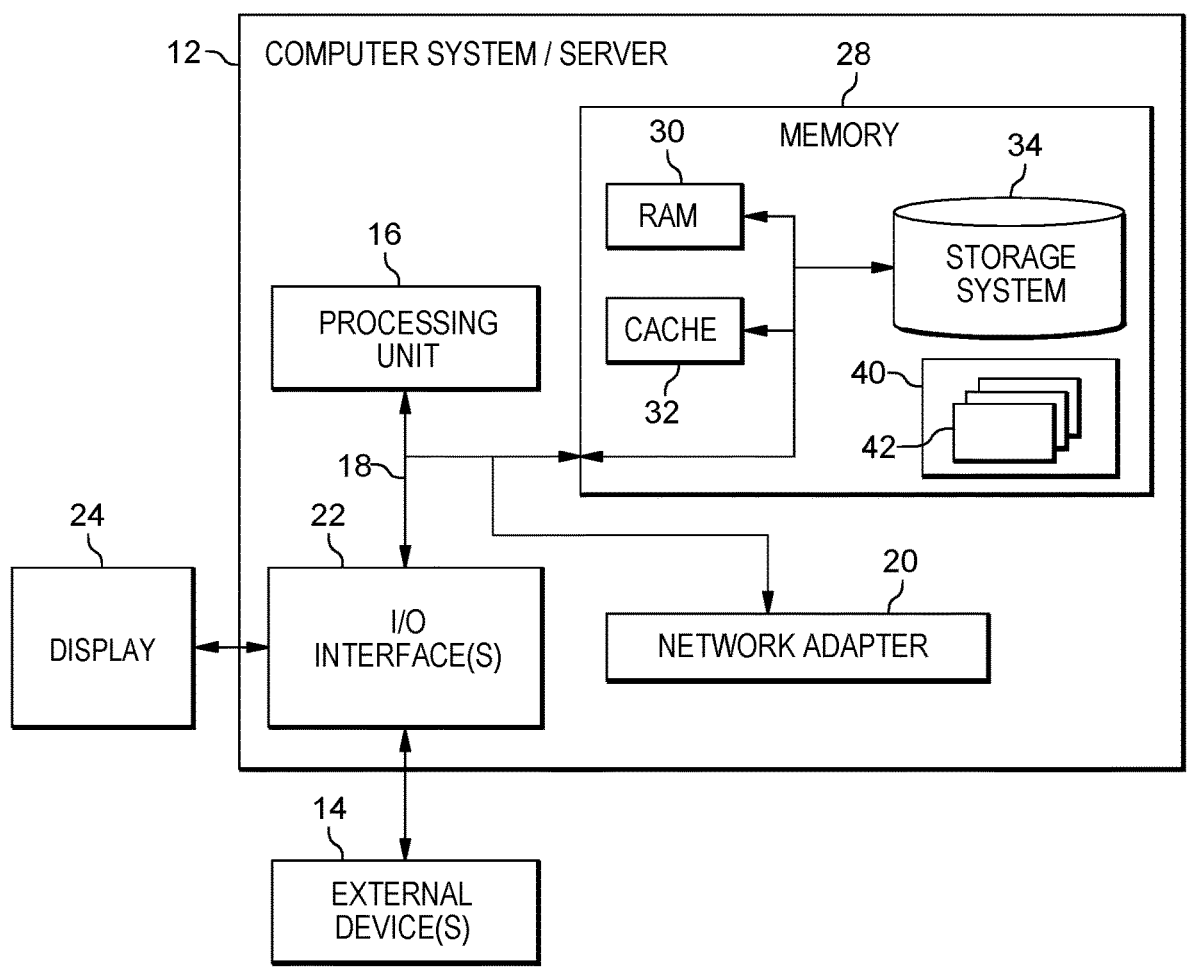
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Various cognitive algorithms or machine learning algorithms comprise classifiers, meaning that they classify records (data, metadata, objects, etc.) into groups, based on relationships between data elements in the metadata from the records. In some embodiments of the present invention, the program code can utilize the frequency of occurrences of features in mutual information to identify and filter out false positives. In general, program code utilizes a classifier to create a boundary between data of a first quality data of a second quality. As a classifier is continuously utilized, its accuracy can increase as testing the classifier tunes its accuracy. When training a classifier, program code feeds a pre-existing feature set describing features of metadata and/or data in the one or more cognitive analysis algorithms that are being trained. The program code trains the classifier to classify records based on the presence or absence of a given condition, which is known before the tuning. The presence or absence of the condition is not noted explicitly in the records of the data set. When classifying a source as providing data of a given condition (based on the metadata), utilizing the classifier, the program code can indicate a probability of a given condition with a rating on a scale, for example, between 0 and 1, where 1 would indicate a definitive presence. The classifications need not be binary and can also be values in an established scale. Various existing machine learning algorithms can be utilized as classifiers in cognitive analyses, including but not limited to, a Naïve Bayes Classifier Algorithm, a K Means Clustering Algorithm, a Support Vector Machine Algorithm, an Apriori Algorithm, Linear Regression, Logistic Regression, an Artificial Neural Networks, Random Forests, Decision Trees, and Nearest Neighbours.

One perceived limitation of existing cognitive algorithms that are utilized as classifiers is that they are generally trained by data sets that are perceived to comprise static attributes. For example, a given classifier could classify flowers by leaf size, petal color, and petal count, etc. The classifier relies on the consistency of these attributes in order to operate. However, attributes, including those utilized by a classifier, can change over time and these changes could affect the results of a classification. For example, at a given point in time, a given flower could have fewer petals and/or more petals, based on the life cycle of the flower. If the life cycle is not taken into account by the classifier, the classifier could incorrectly classify the subject flower.

Embodiments of the present invention include a computer program product, a computer-implemented method, and a computer system, which include program code executing on one or more processors that establishes a temporal classification corpus related to establishing and verifying temporal norms, including but not limited to, historical, cultural, and geographic norms. As described herein, aspects of various embodiments of the present invention enable the generation, training, and utilization of a classifier that perceives the temporal qualities of data and metadata that comprise attributes. Thus, as will be described in greater detail, based on program code in embodiments of the present invention, determining temporal classifications for data and identifying inaccuracies in these classifications, classification is enabled based on dynamic attributes, rather than only static attributes. Because features within most datasets have a tendency to vary temporally, as explained herein, in embodiments of the present invention, which include a computer system, a computer-implemented method, and a computer program product, include program code executing on at least one processing circuit that enables the utilization of temporal variations in attributes in making classifications.

One isolated example in which temporal qualities of an attribute enable a classifier that utilizes temporal data to provide a more accurate classification is a physical gesture. It is the progression of the gesture that provides the program code with insight (cognitively) into the meaning of the gesture. Capturing and analyzing a location of a hand of an individual making a gesture at a given point in time (in isolation) would be unlikely to enable comprehension and thus, classification, of a gesture. The changes in the position, of the hand, over time, lend meaning to the movement, which enables a classifier that appreciated these temporal qualities to classify the gesture correctly.

Embodiments of the present invention, include a computer-implemented method, a computer program product, and a computer system that include program code executing on at least one processor that enables temporal classification through cognitive analysis by performing one or more of the following aspects: 1) generating a corpus (e.g., collection, compilation, database) of temporal classifications as they relate to historical, cultural, and geographic norms (e.g., standards, models, patterns, etc.); and/or 2) applying the corpus to data and/or metadata sources (e.g., scripts, set sketches, images, etc.) to isolate historical, cultural, and geographic inconsistencies within the corpus. In embodiments of the present invention, the program code classifies content from sources in the context of a timeline. In some embodiments of the present invention, program code establishes temporal classifications as they relate to temporal norms (e.g., historical, cultural, and geographical norms) by performing a cognitive analysis of media (e.g., photographs, images, videos, audio recordings, texts, etc.) from historical and/or verified historically accurate sources. The program code tunes the temporal classifications as they relate to temporal norms (e.g., historical, cultural, and geographical norms) by ingesting (obtaining, e.g., based on input) source material with temporal qualities (e.g., scripts, sketches, demo reel footage, etc.) and identifies temporal (e.g., historical, cultural, and geographical) inaccuracies that are inconsistencies with temporal classifications. In some embodiments of the present invention, the program code classifies input sources (e.g., television/streaming/movie scripts, books, blog posts, museum exhibits, etc.) to detect historical, cultural, and geographic inconsistencies in what is illustrated in the source material, compared to historically derived norms.

Embodiments of the present invention are inextricably tied to computing and provide a practical solution utilizing computing resources. For example, embodiments of the present invention are inextricably tied to computing at least because the program code in these embodiments utilizes the digital communication channels and the real-time communications, enabled in a distributed computing environment, and performs a cognitive analysis (accessing resources, with the permission of users, available based on the connectivity of the computing system) to facilitate data collection as well as data analysis, in order to generate a corpus of temporal classifications, to tune this corpus, and to utilize the corpus as a classifier. Additionally, embodiments of the present invention relate to the field of artificial intelligence (AI) as utilized in classifiers and specifically enabling transparency in decision-making (e.g., classification) by AI based on cognitively analyzing data to be utilized to train the AI, based on a temporal analysis, and selecting data based on the accuracy of the analysis.

Embodiments of the present invention provide a practical application in their utilization of computing systems. Aspects of embodiments of the present invention address a particular practical issue and provide a method to address this issue. For example, determining if material is historically accurate is time consuming and is a highly manual task. In the context of making this determination for a film, this manual analysis involves the use of historians to verify that objects, settings, speech, musical genre and dress, etc., in shown on screen and/or described in writing, are consistent with the time period in which the content is set. Among the factors to consider when making this determination are the historical accuracy of the elements (e.g., is a watch worn by a character of the time period of the film), cultural accuracy (e.g., is the seating arrangement at dinner in a given scene according to the custom of the time), and/or geographic accuracy (e.g., were the vehicles that the characters are driving available in the city in which the film is set at the time that the film is set). Embodiments of the present invention provide a practical application to the historical, cultural, and/or geographic classifications, through the generation, training, and application of cognitive analysis algorithms, which automate the understanding of the temporal norms, and determine if a given input source is compliant with to these established norms. In some embodiments of the present invention, the program code generates a display that enables a user, via a computing interface, to visualize when elements of a source are not compliant with one or more of the norms.

The practical application of embodiments of the present invention can be appreciated through the understanding of non-limiting use cases, six of which are discussed below. As a first example, a producer of a movie may request that an actor wear a watch for a given scene. The program code can recommend to the producer from which watches he should select a watch for the given scene based on providing, to the director, a visual of which watches are historically, culturally, and/and geographically accurate to use in the movie scene. In a second example, a television producer is designing a set to reflect the aesthetic of a given time period. The producer has obtained a given furniture piece which the producer believes to be authentic to the desired era. In some embodiments of the present invention, the program code can verify the placement of the furniture piece on set. For example, the program code can recommend to the producer that the furniture piece should be moved from a first proposed location to a second location to be more authentic to the era. In yet a third example, a video producer is shooting a business meeting in a conference room in a given geographic location, a particular country. Program code in embodiments of the present invention can analyze sample footage and recommend to the producer that the attendees of the business meeting be seated differently, based on the cultural traditions of the geographic location. In a fourth example, an appraiser of historical pictures receives a request to authenticate some old pictures from individual interested in purchasing them. The program code analyzes a combination of components that comprise the pictures and determined that the art has been reproduced and the pictures are unlikely to be original to the time period represented to the individual. In a fifth example, a museum curator utilizes program code in embodiments of the present invention to analyze the elements of exhibits that are specific to certain temporal periods and the program code determines that certain items are historically inaccurate and informs the curator of the inconsistencies. Finally, in a sixth non-limiting example, program code in embodiments the present invention analyzes a movie clip and determines that a product requested by a character in the movie clip was not available to the time in which this scene is set.

Embodiments of the present invention provide significantly more than existing methods of contextualizing objects. Existing technologies that account for historical context are not utilized for the practical application discussed above. Rather, some existing technologies map historical markers onto a physical scene using augmented reality, while others generate images that incorporate historical elements. However, these existing technologies do not include program code that automatically detects historical, cultural, and geographic inconsistencies in an object and/or medium (e.g., text, demo reel, film, manuscript, sketch, image, design, etc.). For at least this reason, aspects of various embodiments of the present invention provide a significant advantage in this area.

FIG. 1 is a workflow 100 that provides an overview of certain aspects of some embodiments of the present invention. In some embodiments of the present invention, program code executed by one or more processor samples historical and historically accurate content (e.g., photographs, video footage, audio recordings, written documentation, etc.) (110). In some embodiments of the present invention, the program code obtains this content and/or is provided this content by a user, through an interface. Historical content is content that was created within a defined period (e.g., a photograph taken in 1922, video news footage from 1953, and/or a written diary account from 1734). Historically accurate content is content certified by a trusted source, indicating the content is historically accurate, even if it was not created during the time period it relates to (e.g., scholarly books, peer reviewed papers, and/or scholarly encyclopedias). Photographs in the content can have a verifiable date and location, indicating their time and place of capture. Video footage in the content can include video footage with a verifiable date and location indicating the time and place of capture. Documentation comprising this content can include forms of written content, including but not limited to, journals, historical books, and/or news articles. Audio comprising the content can include audio recordings of conversations, radio broadcasts, television shows, movies, etc., that can be verified to enable comparison of music genre and/or words. In embodiments of the present invention, the content obtained by the program code is tagged (e.g., in metadata) with information relevant to its temporal context (e.g., source of capture, date of creation, and/or geographical location).

In some embodiments of the preset invention the program code cognitively classifies, through sorting, the historical and historically accurate content to generate a temporal classification corpus (120). In some embodiments of the present invention, the program code cognitively classifies the content to generate the corpus utilizing one or more of: audio content and tone analysis, visual recognition, and/or natural language understanding. In some embodiments of the present invention, the program code can utilize an existing cognitive agent to cognitively classify the historical and historically accurate content. One such cognitive agent that can be utilized in embodiments of the present invention is IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to classify the content to generate a temporal classification corpus. As will be discussed herein, three APIs that can be utilized in embodiments of the present invention include, but are not limited to IBM Watson® Natural Language Classifier (NLC), IBM Watson® Natural Language Understanding, and IBM Watson® Tone Analyzer. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine or not.

Because generating a temporal classification corpus can be an intensive process with many factors, in some embodiments of the present invention, the program code generating the corpus can utilize a neural network (e.g., Artificial Neural Networks) to predict/determine the groupings (norms) in data from a given source, based on the inputs (e.g., metadata, source data, accompanying data) provided. Utilizing the neural network, the program code can predict subsequent data, enabling the rapid determination of a temporal context for a given source. The program code obtains (or derives) the initial attributes from the metadata to generate an array of values (possible attributes) to input into input neurons of the neural network. Responsive to these inputs, the output neurons of the neural network produce an array which includes the identified attributes as well as the predicted attributes. The neural network can also be utilized to process the metadata of multiple sources simultaneously, and in processing these data, the program code can generate and predict relationships between sources for utilization in generating a data structure of classifications for the sources (e.g., cultural, historical, and/or geographic contexts).

As discussed above, in some embodiments of the present invention, the program code utilizes a neural network to analyze user data (e.g., source data and metadata) and generate the data structures for use in classifying the sources into temporal contexts. Neural networks are a biologically-inspired programming paradigm which enable a computer to learn from observational data, in this case, the data metadata ingested from the source materials. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools (e.g., classifiers))). In general, program code utilizing neural networks can model complex relationships between inputs and outputs and identify patterns and attributes in data, thus providing for the establishment of the norms for the various temporal groupings in the corpus, in embodiments of the present invention. Because of the speed and efficiency of neural networks, especially when parsing multiple complex data sets, neural networks and deep learning both provide solutions to ingesting and organizing data from diverse sources. In fact, neural networks can be used to solve many problems where data inputs are varied and can include natural language processing, which is relevant to embodiments of the present invention when determining the temporal context of a disparate group of data sources.

Some embodiments of the present invention may utilize a neural network to predict additional temporal contexts for a data source, for inclusion in the data structure, based on the inputs provided. Utilizing the neural network, the program code can predict subsequent data. The program code obtains (or derives) the initial attributes from the source data and/or metadata (in the cognitive analysis 227 (FIG. 2)) to generate an array of values (possible attributes) to input into input neurons of the neural network. Responsive to these inputs, the output neurons of the neural network produce an array that includes the identified attributes as well as the predicted attributes (as related to data quality and non-objective influence).

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation.

Figure 2:
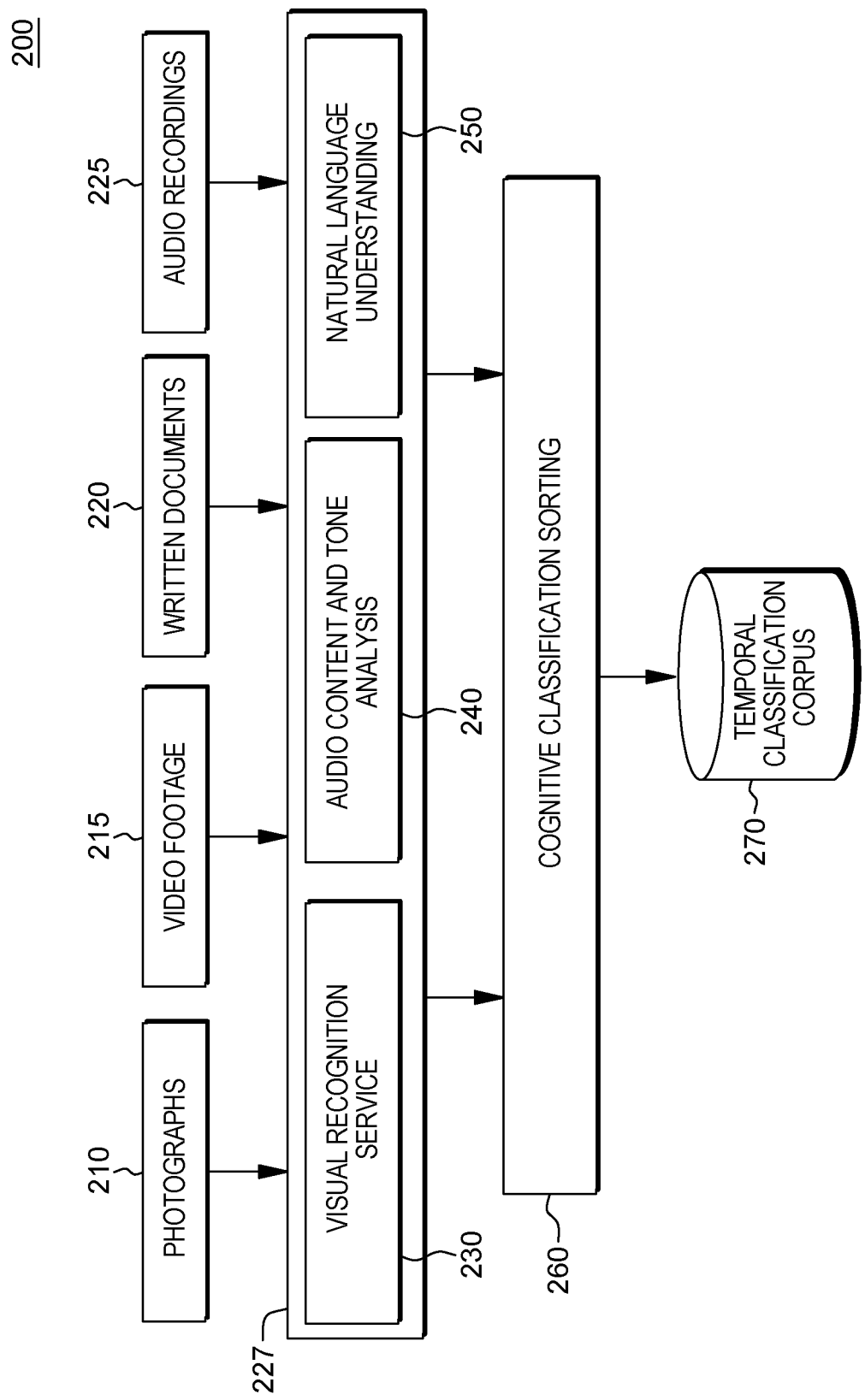
FIG. 2 illustrates various aspects of some embodiments of the present invention.

FIG. 2 illustrates a workflow 200 of the program code generating the temporal classification corpus. Referring to FIG. 2, in order to classify the content, in some embodiments of the present invention, the program code ingests the content (e.g., photographs 210, video footage 215, written documentation 220, and/or audio recordings 225) and cognitively analyzes 227 it, utilizing one or more of visual recognition 230, audio content and tone analysis 240, and/or natural language understanding 250 processes. In some embodiments of the present invention, the program code utilizes various APIs in order to ingest content provided in different formats. The program code can utilize existing cognitive agents to perform the visual recognition 230, audio content and tone analysis 240, and/or natural language understanding 250 analyses. In some embodiments of the present invention, the program code provides the content to an independent cognitive agent, which returns attributes, patterns, etc., identified by the cognitive agent, which are classified (i.e., cognitively sorted) by the program code 260 before being saved in the temporal classification corpus 270 by the program code.

In some embodiments of the present invention, the program code can utilize a visual recognition 230 service to understand objects, actions, scenes, and/or people within the content, including but not limited to, within images comprising the content. As part of the image recognition, the program code can also utilize an image metadata repository to gain external intelligence in order to identify various entities within the content. IBM Watson® Visual Recognition is an example of one cognitive agent that can be utilized by the program code to perform a visual recognition on the content, which includes analyzing the video footage that is included in the content to perform frame sampling in order to extract various still images from the video footage and to perform visual recognition on these samples. In embodiments of the present invention, the program code can utilize IBM Watson® Video Enrichment to divide the one or more videos comprising the content into semantic sections by aggregating the audio and video content of the scenes. Various existing shot translation technologies can be utilized in embodiments of the present invention in order to segment the one or more videos into fragments that can be linked to entities recognized in the content. Thus, the program code can segment each video into fragments and extracts entities, including but not limited to, objects, entities, actors, locations, etc., from both the images and the audio associated with the fragments (220). Thus, in some embodiments of the present invention, the program code: 1) identifies images, including embedded text, within the fragments; and/or 2) identifies (spoken) entities in audio contemporaneous with the fragments.

The program code can also utilize various machine learning and deep learning techniques to perform this image recognition and analysis, as machine learning and deep learning methods can be a useful approach to image recognition, including utilizing a convolutional neural network (CNN). This is only one example of a learning model that can be utilized in embodiments of the present invention and is provided for illustrative purposes and not to suggest any limitations or requirements. CNNs are so-named because they utilize convolutional layers that apply a convolution operation (a mathematical operation on two functions to produce a third function that expresses how the shape of one is modified by the other) to the input, passing the result to the next layer. CNNs are widely used in large-scale (image) recognition systems, giving state-of-the-art results in segmentation, object detection and object retrieval. CNNs can be of any number of dimensions, but most existing CNNs are two-dimensional and process single images. These images contain pixels in a two-dimensional (2D) space (length, width) that are processed through a set of two-dimensional filters in order to understand what set of pixels best correspond to the final output classification. A three-dimensional CNN (3D-CNN) is an extension of the more traditional two-dimensional CNN and a 3D-CNN is typically used in problems related to video classification. 3D-CNNs accept multiple images, often sequential image frames of a video, and use 3D filters to understand the 3D set of pixels that are presented to it.

Returning to FIG. 2, in some embodiments of the present invention, the program code performs an audio and tone analysis 240 on the content and/or a cognitive analysis that includes natural language understanding 250. As in the case of the visual recognition service 230, the program code in embodiments of the present invention can utilize an existing cognitive agent to perform these analysis, which include, for audio and tone analysis 240, determining, tone, and pronunciation, and for natural language understanding 250 analysis, textual analysis and metadata extraction from unstructured content such as concepts, including but not limited to, entities, and keywords. As aforementioned, three APIs that can be utilized in embodiments of the present invention to enable the program code to perform audio and tone analysis 240 and or gain natural language understanding 250 include, but are not limited to IBM Watson® Natural Language Classifier (NLC), IBM Watson® Natural Language Understanding, and IBM Watson® Tone Analyzer. In addition, embodiments of the present invention can utilize certain of the speech to text analysis functionality, including Entity Extraction. For example, the program code converts the audio of the content to text and can then utilize Entity Extraction to extract entities from the textual representations of the audio documents as they are being indexed. The program code can utilize the IBM Watson® Natural Language Understanding API to analyze written documentation comprising the content, to analyze the text to extract metadata from unstructured content such as concepts, entities, and keywords Program code in embodiments of the present invention, the program code can utilize a group of APIs referred to as Watson Discovery®. Certain of the APIs in Watson Discovery® can be utilized by the program code in embodiments of the present invention, including NLP capabilities, which the program code can utilize to extract elements from the audio, including but not limited to, sentiment, entities, concepts, and/or semantic roles. In some embodiments of the present invention, APIs utilized by the one or more programs may include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction. As understood by one of skill in the art, the IBM Watson® APIs and other services are only provided to offer an example of possible APIs and existing technologies that can be integrated into embodiments of the present invention and to illustrate the functionality of the program code in embodiments of the present invention, whether through integration of an existing cognitive engine or not.

In some embodiments of the present invention, the program code can utilize Watson's cognitive computing to generate textual content from the one or more videos comprising the content, by providing voice recognition, machine translation, text to speech, and other semantic tools that enable entity recognition within the audio. The tools utilized to generate textual content may include the IBM Watson® Speech to Text API endpoint. Program code in some embodiments of the present invention process media (videos) through the IBM® Cloud Video Platform, to produce an associated audio. The program code generates a textual representation of the audio by applying a speech to text service to the audio.

Returning to FIG. 2, the program code sorts the results of the cognitive classifications 260, which as aforementioned, in performing the cognitive classifications (e.g., visual recognition 230, audio content and tone analysis 240, and/or natural language understanding 250) the program code can utilize existing cognitive agents. Based on the cognitive classifications, the program code sorts the content into sorting groups, wherein the content in each sorting group of a similar (e.g., within an established tolerance threshold based on a timeline) historical, cultural, and/or geographic grouping For example, the program code can determine that a portion of the content, based on the analysis of its tagging, was generated within a given time period (e.g., a pre-defined x year period), in a given geographic location, and in a given context (e.g., at a business meeting, during a party, etc.). This content can be grouped together by the program code even when the types of content comprising the group are diverse (e.g., a photograph, a video news report, and a written journal entry). The program code generates this grouping for the content of each context grouped in a temporal classification corpus 270 repository. In the temporal classification corpus 270 repository, the program code groups the content by shared classification and historical, cultural, and/or geographic groupings. The groupings in the temporal classification corpus 270 can be understood as norms, for the given historical context, geographic context, and cultural context, for which they are assigned. For example, a grouping in a corpus, through cognitive analysis of multiple historical and historically accurate training data examples, that the color of a refrigerator in 1920 in the United States was more often a color other than white, and that popular colors included seafoam green.

Figure 3:
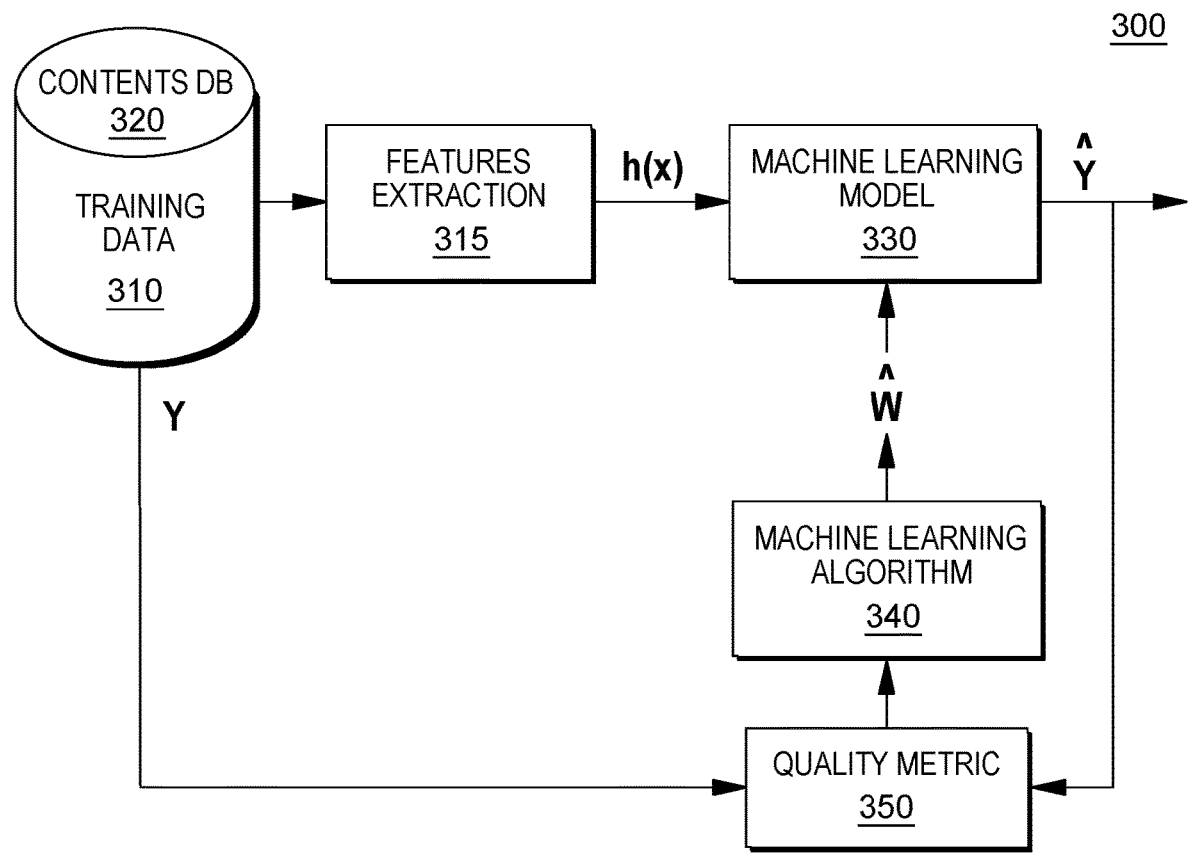
FIG. 3 illustrates various aspects of some embodiments of the present invention.

FIG. 3 is an example of a machine learning training system 300 that can be utilized to perform cognitive analyses of FIG. 2 to classify content into groupings to generate the temporal classification corpus 270 repository (FIG. 2). In embodiments of the present invention, program code can obtain the content. In embodiments of the present invention, utilizing the tagging in the content, the program code can generate context classifications (e.g., historical, cultural, and/or geographic) for the content (e.g., photographs 210, video footage 215, written documentation 220, and/or audio recordings 225 (FIG. 2)). The context classifications for the content include machine learned contextual elements. As understood by one of skill in the art, machine learning (ML) solves problems that cannot be solved by numerical means alone. In this ML-based example, program code extracts various features/attributes from training data 340, which is the tag content obtained/ingested by the program code (e.g., photographs 210, video footage 215, written documentation 220, and/or audio recordings 225 (FIG. 2)). The features are utilized to develop a predictor function, h(x), also referred to as a hypothesis, which the program code utilizes as a machine learning model 230. In identifying various features/attributes (e.g., patterns) in the training data 210, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code can utilize a machine learning algorithm 340 to train the machine learning model 330 (e.g., the algorithms utilized by the program code), including providing weights for the conclusions, so that the program code can prioritize various attributes in identified in the content to associate the content with temporal groupings, in accordance with the predictor functions that comprise the machine learning model 330. The conclusions can be evaluated by a quality metric 350. By selecting a diverse set of training data 310, the program code trains the machine learning model 130 to identify and weight various attributes (e.g., features, patterns) that correlate to various temporal factors in the content.

In some embodiments of the present invention, the generation of the corpus 270 (FIG. 2) and the groupings within is an iterative process in which a user can participate. In some embodiments of the present invention, the program code is preconfigured with threshold of historic, geographic, and/or cultural similarity. For example, the program code may be preconfigured to regard sources that are contextualized within five years of each other within the same grouping (e.g., within a certain distance of each other, within the same country, in the same language, within the same neighborhood, etc.). These predefined thresholds can influence the types and numbers of groupings that the program code automatically generates, based on the training (generation of the corpus). As additional data, which is historical and/or historically accurate, is ingested by the program code, the program code can tune these categories, and, in some situations, suggest new groupings to a user. For example, although the corpus is configured to create decade groupings within geographic areas of a ten mile radius using households in a given community, the program code can recognize, through cognitive analyses, certain recurring differences between the sources separated by five years. The program code can suggest to the user that a grouping be created within the corpus for a five year period based on these consistent differences. In some embodiments of the present invention, the program code can automatically generate this new grouping, but in other embodiments of the present invention, the program code communicates this option to the user (e.g., via an interface to a computing device utilized by the user) and can generate or not generate the new grouping based upon user input. In order to enable the user to manage the groupings, the program code can provide the user with visuals of the various groupings (e.g., compilations of temporal contextual elements that comprise sources classified into a given group).

Figure 4:
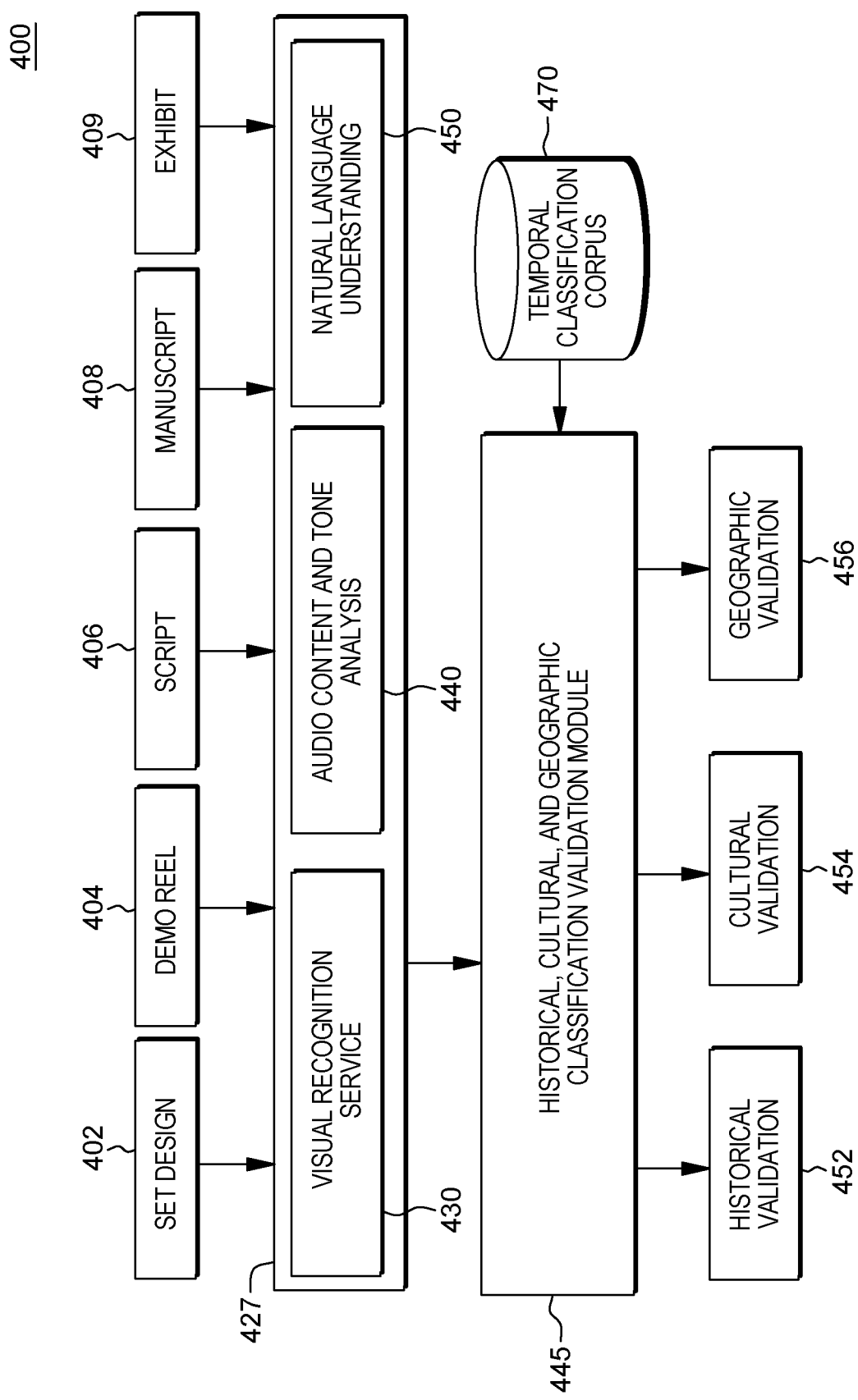
FIG. 4 illustrates various aspects of some embodiments of the present invention.

Returning to FIG. 1, in some embodiments of the present invention, the program code ingests data and validates temporal qualities of the data (130). For example, in some embodiments of the present invention, the program code validates the temporal context of ingested data by performing historical, cultural, and geographic/or classification validation. Examples of data (e.g., sources) ingested to by the program code and validated by the program code, utilizing the corpus, include, but are not limited to, exhibits, set sketches, demo reels, and/or scripts. FIG. 4 depicts the validation 400 of ingested data by the program code in some embodiments of the present invention. As aforementioned, the program code accomplishes this validation based on utilizing the previously generated temporal classification corpus repository 470. In embodiments of the present invention, the program code obtains data from sources (e.g., via user input/upload, etc.) to validate for temporal context (e.g., to perform historical, cultural, and/or geographic classification validation of ingested input sources). The program code determines the temporal accuracy (e.g., historical, cultural, and geographic accuracy) of the purported temporal context of the data. Certain data sources, that are provided as non-limiting examples, which the program code can validate for temporal accuracy can include, but are not limited to, a set design 402 (e.g., provided as a sketch and/or a photograph), a demo reel 404 (i.e., video footage of a set and/or actors), a script 406 (i.e., written script describing a scene, such as a script for a television show, movie, and/or podcast), a manuscript 408 (e.g., a book, blog article, and/or magazine story) a medium capturing an exhibit 409 (e.g., a photographic, audio, and/or video capture of an historic artifact). With each source provided to the program code for temporal accuracy validation, the assumed temporal context of the source is provided (e.g., as metadata, tags, accompanying data file, data in the source, etc.). Thus, in embodiments of the present invention, the program code obtains a data source and data indicating an assumed temporal context (e.g., historical, cultural, and geographic context) of the data source. For example, the program code can obtain a script 406 with data (e.g., metadata, linked data and/or data comprising the source) indicating that the script is set at a given time (e.g., July 1922), in a given location (e.g., the family home of a working class family), in a given geographic location (e.g., Nebraska).

The program code perform a cognitive analysis of the source 427. In embodiments of the present invention, the cognitive analysis performed on a new source is the same as that performed on a source utilized to establish the corpus 470. Thus, the program code performs one or more of visual recognition 430, audio content and tone analysis 440, and/or natural language understanding 450 on the source being validated. As with the generation of the corpus 470 (e.g., training of the system), the program code can utilize an existing cognitive agent, including but not limited to those discussed above, to perform the cognitive analysis. Thus, in embodiments of the present invention, the program code classifies the content contained within the supplied input sources by performing visual recognition 430 on the sources by analyzing sketches, photographs, and frame sampling of demo reel footage. Using the example script discussed above, in performing a visual recognition 430 of this script, the program code can generate the following classifications: kitchen, oven, wireless radio, counter, and stove. Additionally, the program code can perform NLP (e.g., audio content and tone analysis 440, and/or natural language understanding 450) to analyze scripts, manuscripts, and written content containing within the supplied input sources to classify the sources.

NLP algorithms are examples of cognitive analytics tools that contextualize behaviors. NLP includes different techniques for interpreting human language, ranging from statistical and machine learning methods to rules-based and algorithmic approaches. NLP can include tokenization and parsing, lemmatization/stemming, part-of-speech tagging, language detection and identification of semantic relationships in order to break down language into shorter, elemental pieces, try to enable program code executing on at least one processing device which utilizes the NLP algorithms to understand relationships between the pieces and explore how the pieces work together to create meaning. Capabilities of NLP, specifically, include, but are not limited to content categorization, topic discovery and modeling, contextual extraction, sentiment analysis, speech-to-text and text-to-speech conversion, document summarizing, and/or machine translation. These various techniques all attempt to contextualize the content of the language captured such that it can be utilized to provide additional value. For example, one common use of NLP data is in decision-making systems. Based on cognitively analyzing data, the program code can predict additional data. Thus, these decision-making systems analyze data and surroundings, solve or anticipate problems, and learn or self-teach to adapt to a variety of tasks.

Returning to FIG. 4, based on classifying a source, the program code validates the classifications. For ease of understanding, the program code utilized to perform this validation, based on accessing the corpus 470 for comparison, is depicted as a historical, cultural, and geographic validation module 445. The separation of this functionality into a module is provided for illustrative purposes only and the program code comprising this historical, cultural, and geographic validation module 445 can stand alone as well as being part of program code that accomplishes one or more other aspects of embodiments of the present invention described herein. The program code of the historical, cultural, and geographic validation module 445 compares the input classifications of the sources with the classification groupings captured in the temporal classification corpus 470. In some embodiments of the present invention, the program code validates each source based on its historical 452, cultural 454, and geographic 456 contexts. In making this comparison, the program code can extract certain features from the source and compare these features to the same features in the corpus, from the provided temporal context of the new source data. Thus, the program code would compare a stove pictured in a photograph from 1922 with a stove in the corpus from this time period, not from a different time period.

Returning to FIG. 1, based on the validation (130), in some embodiments the program code reports temporal inconsistencies (140). In some embodiments of the present invention, the temporal inconsistencies can include, but are not limited to, historical, cultural, and/or geographic validation inconsistencies. The program code can provide each inconsistency within a given confidence level based on both the confidence that the grouping being used for comparison is accurate (based on how often it is utilized for validation), the similarity of the temporal context of the group to the provided context of the source being validated (e.g., these levels can be fixed, such that an 100% confidence level is accorded when the year, location, and/or income range attributed to the source are the same as that in the grouping and the confidence decreases at set increments as the year, location, and/or income range differs from the point of comparison). The confidence level can also be a binary value, indicating confidence based on the temporal contexts matching within a certain predefined threshold. In some embodiments of the present invention, the program code displays the inconsistent item in the source to the user, through a computing interface, with the visual elements of the training materials that conflicted with this element.

Thus, in some embodiments of the present invention, the program code extracts inconsistencies between the input source classifications and the temporal classification corpus 470 (FIG. 4). The inconsistencies can be extracted with a confidence level based upon the strength of the data (e.g., how often a particular grouping has been seen in the corpus). For example, if a particular grouping has been utilized a defined number of times, a particular confidence level is assigned to the results. For illustrative purposes, some non-limiting example of inconsistencies identified by the program code and provided (visualized) to a user are provided below. The example below provide examples of the program code identifying an historical validation inconsistency, a cultural validation inconsistency, and a geographic validation inconsistency.

Returning to FIG. 1, in some embodiments of the present invention, the program code notifies the user of the inconsistencies (140). In some embodiments of the present invention, the program code can solicit feedback regarding the notification. For example, the program code can request that the user supply alternate temporal data with which the program code attempt to validate the item. In embodiments of the present invention where the program code does not determine that there are inconsistencies, the program code can add the extracted entities from the item being validated to the relevant grouping in the corpus. In some embodiments of the present invention, where the entities extracted are adjudged consistent, the program code can enhance the corpus by adding entities to the appropriate groupings that could not be evaluated based on existing content in the corpus. Thus, the program code adds supplemental information to the grouping of the corpus to enable verification of additional features (norms) moving forward.

In an embodiment of the present invention, the program code ingests a photograph some embodiments of the present invention that, according the metadata associated with the photograph, purports to be representing a kitchen in Nebraska in 1922. A user provide the program code with the photograph utilizing a user interface on a personal computing device. The program code cognitively analyzes the photograph and identifies various elements in the photograph, including but not limited to, a wireless radio. The program code applies the corpus, locating a grouping in the corpus with an applicable temporal context (e.g., Nebraska, 1922, family home), and determines that a wireless radio would be a furniture implement in a family room, not a kitchen. The program code reports this historical validation inconsistency to the user, via a user interface on a personal computing device. In some embodiments of the present invention, the program code determines that the program code has utilized the grouping in the corpus being applied x number of times and that x times is indicative of an eighty-five (85) percent confidence level.

In an embodiment of the present invention, a user uploads, via a user interface, a seating chart for a business meeting that is to take place in Tokyo, Japan. The business meeting seating chart designates a host and a guest and the location, Tokyo. The program code determines, based on cognitive analysis, the positioning of the host and the guest in the seating chart and compares these extracted attributes to a relevant grouping the corpus (e.g., current time, business etiquette, Tokyo). The program code determines an inconsistency between the norm established in the corpus, dictating that a host is seated closest to the door, and the seating chart, which seats the host furthest from the door. The program code notifies the user of this cultural inconsistency. In this embodiment of the present invention, based on the seating norm in the corpus having been established for a threshold amount of time (e.g., two years) the program code provides the notification of the inconsistency with a confidence level business that matches the length of the norm, in this case, as an example, ninety-one percent (91%). This confidence level can be based on a recorded observation in some embodiments of the present invention.

In an embodiment of the present invention, a user uploads a photograph that purports to be from 1939 and taken in New York City and show an Aston Martin Atom car. The program code cognitively analyzes the photograph and extracts the car and compares the car, in the context of the photograph, to relevant norms in the corpus. The program code determines that the Aston Martin Atom car was not available in the United States (only in the United Kingdom) in 1939. Because the norm is based on a definitive fact (availability of cars during the time in a given geographic area), the program code alerts the user to this inconsistency in the photo (meaning that the photo is not accurately represented) with a ninety-nine (99) percent confidence level.

Embodiments of the present invention include a computer-implemented method, a computer program product, and a computer system, where program code executing on one or more processors ingests content from one or more sources of content and, for each source of the one or more sources of the content, one or more attributes comprising a verified temporal context of the source. The program code cognitively analyzes the content, by applying one or more entity recognition algorithm, to the content, to identify and extract entities in each source. The program code classifies each extracted entity of the extracted entities in a given grouping of a plurality of groupings, where for each extracted entity, the classifying is based on at least one attribute of the one or more attributes comprising the verified temporal context of the source from which the extracted entity was extracted. The program code generates a corpus comprising the plurality of groupings, where each grouping of the plurality of groupings in the corpus comprises extracted entities with verified temporal contexts consistent with a defined time period.

In some embodiments of the present invention, the one or more entity recognition algorithm is selected by the program code from the group consisting of: a visual recognition algorithm, an audio content and tone analysis algorithm, and a natural language understanding algorithm.

In some embodiments of the present invention, the one or more sources are selected by the program code from the group consisting of photographs, images, videos, audio recordings and text-based media.

In some embodiments of the present invention, one or more attributes comprising the verified temporal context for each source of the one or more sources of the content comprises an attribute selected by the program code from the group consisting of: a time attribute, a location attribute, and a cultural attribute.

In some embodiments of the present invention, the one or more entity recognition algorithm comprises the visual recognition algorithm and cognitively analyzing the content, by applying the one or more entity recognition algorithm comprises identifying and extracting entities comprising identifiers of objects, actions, scenes, and people visually represented in the content.

In some embodiments of the present invention, the one or more entity recognition algorithm comprises the natural language understanding algorithm and cognitively analyzing the content, by applying the one or more entity recognition algorithm comprises identifying and extracting entities comprising concepts and keywords from textual data and metadata comprising the content.

In some embodiments of the present invention, the one or more entity recognition algorithm comprises the audio content and tone analysis algorithm and cognitively analyzing the content, by applying the one or more entity recognition algorithm comprises identifying and extracting meanings, tones, and pronunciations from audio in the content.

In some embodiments of the present invention, the program code ingests new content, the new content comprising one or more attributes comprising an unverified temporal context of the new content. The program code cognitively analyzes the new content, by applying one or more entity recognition algorithm, to the new content, to identify and extract entities in the new content. The program code classifies the extracted entities from the new content into the given grouping, where the classifying is based on the unverified temporal context of the new content. The program code identifies one or more inconsistencies between the extracted entities comprising the given grouping in the generated corpus and the extracted entities from the new content.

In some embodiments of the present invention, the program code notifies a client, via an interface on the client communicatively coupled to the one or more processors, of the one or more inconsistencies.

In some embodiments of the present invention, the new content is selected by the program code from the group consisting of: text, demo reel, film, manuscript, sketch, image, and design.

In some embodiments of the present invention, ach grouping of the plurality of groupings in the corpus comprises extracted entities with verified temporal contexts consistent with a defined geographic area.

In some embodiments of the present invention, each grouping of the plurality of groupings in the corpus comprises extracted entities with verified temporal contexts consistent with a defined social group.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the temporal classification corpus 270 470 (FIG. 2, FIG. 4) as well as the computing resources executing the program code in the cognitive analyses 230, 240, 250, 430, 440, 450 (FIG. 2, FIG. 4), the cognitive classification sorting 260 (FIG. 2) and the classification validation 445 (FIG. 4) can each be understood as a cloud computing node 10 (FIG. 5) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
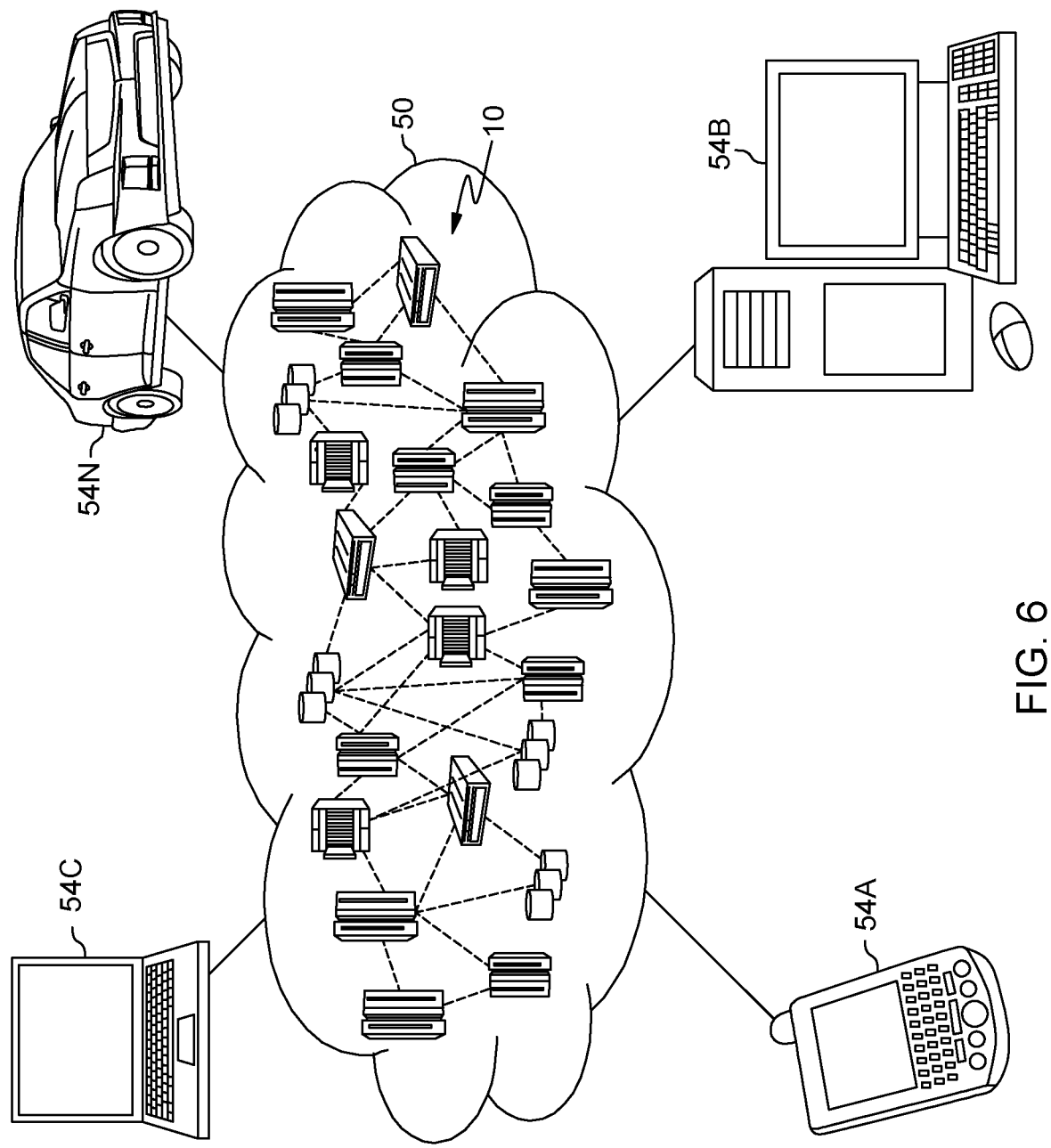
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
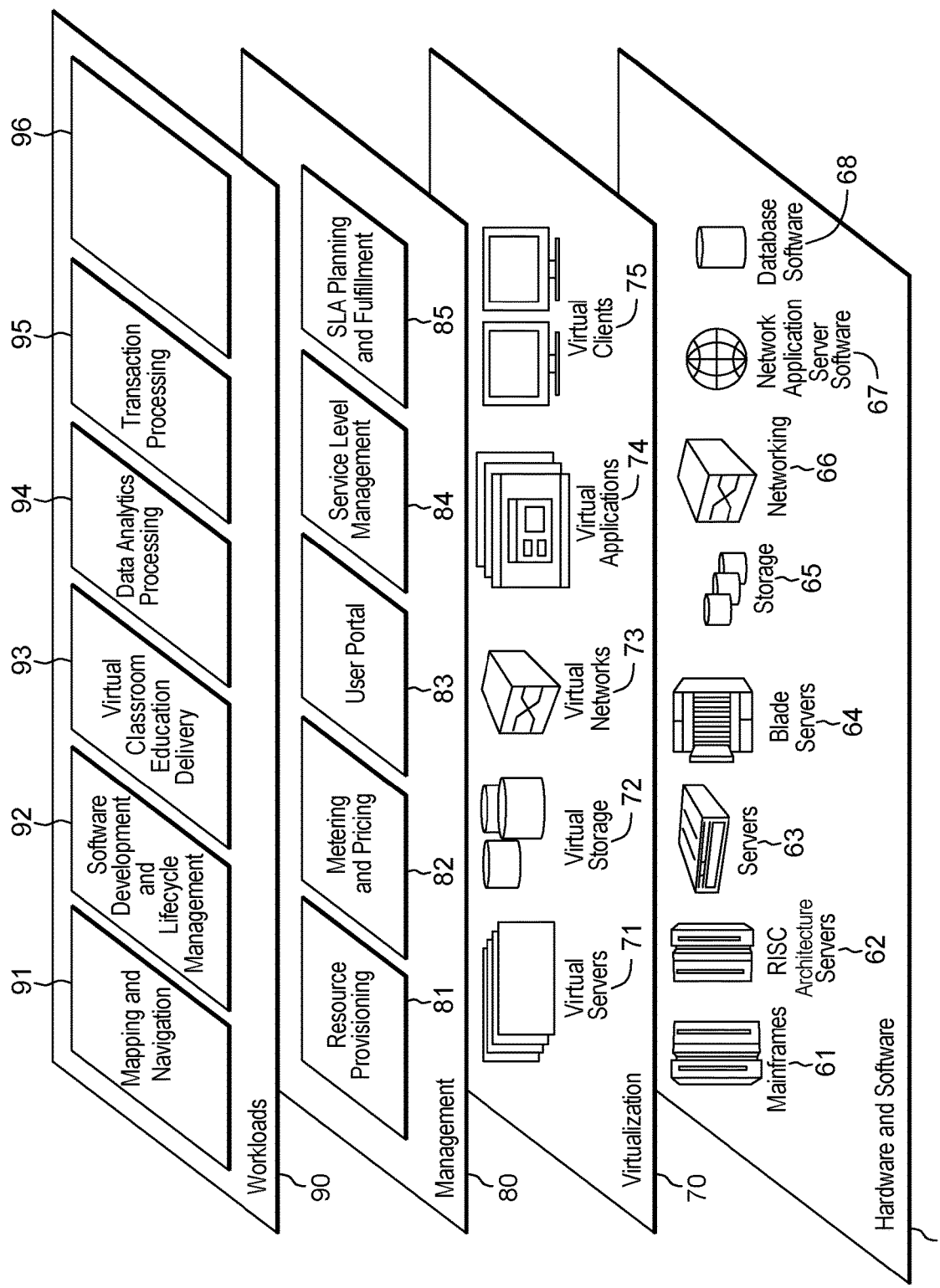
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating and utilizing a corpus to validate temporal contexts of data 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   ingesting, by one or more processors, content from one or more sources of content and, for each source of the one or more sources of the content, one or more attributes comprising a verified temporal context of the source, wherein the verified temporal context attribute comprises an assurance that content associated with the verified temporal context attribute is consistent with date and time data associated with the content, wherein the assurance is based on an image in the content being consistent with the date and time data associated with the content;
   cognitively analyzing, by the one or more processors, the content, by applying one or more entity recognition algorithm, to the content, to identify and extract entities in each source;
   classifying, by the one or more processors, each extracted entity of the extracted entities in a given grouping of a plurality of groupings, wherein for each extracted entity, the classifying is based on at least one attribute of the one or more attributes comprising the verified temporal context of the source from which the extracted entity was extracted; and
   generating, by the one or more processors, a corpus comprising the plurality of groupings, wherein each grouping of the plurality of groupings in the corpus comprises extracted entities with verified temporal contexts consistent with a defined time period.

2. The computer-implemented method of claim 1, wherein the one or more entity recognition algorithm is selected from the group consisting of: a visual recognition algorithm, an audio content and tone analysis algorithm, and a natural language understanding algorithm.

3. The computer-implemented method of claim 1, wherein the one or more sources are selected from the group consisting of photographs, images, videos, audio recordings and text-based media.

4. The computer-implemented method of claim 1, wherein one or more attributes comprising the verified temporal context for each source of the one or more sources of the content comprises an attribute selected from the group consisting of: a time attribute, a location attribute, and a cultural attribute.

5. The computer-implemented method of claim 2, wherein the one or more entity recognition algorithm comprises the visual recognition algorithm and cognitively analyzing the content, by applying the one or more entity recognition algorithm comprises identifying and extracting entities comprising identifiers of objects, actions, scenes, and people visually represented in the content.

6. The computer-implemented method of claim 2, wherein the one or more entity recognition algorithm comprises the natural language understanding algorithm and cognitively analyzing the content, by applying the one or more entity recognition algorithm comprises identifying and extracting entities comprising concepts and keywords from textual data and metadata comprising the content.

7. The computer-implemented method of claim 2, wherein the one or more entity recognition algorithm comprises the audio content and tone analysis algorithm and cognitively analyzing the content, by applying the one or more entity recognition algorithm comprises identifying and extracting meanings, tones, and pronunciations from audio in the content.

8. The computer-implemented method of claim 1, further comprising:
   ingesting, by one or more processors, new content, the new content comprising one or more attributes comprising an unverified temporal context of the new content;
   cognitively analyzing, by the one or more processors, the new content, by applying one or more entity recognition algorithm, to the new content, to identify and extract entities in the new content;
   classifying, by the one or more processors, the extracted entities from the new content into the given grouping, wherein the classifying is based on the unverified temporal context of the new content; and
   identifying, by the one or more processors, one or more inconsistencies between the extracted entities comprising the given grouping in the generated corpus and the extracted entities from the new content.

9. The computer-implemented method of claim 8, further comprising:
   notifying, by the one or more processors, a client, via an interface on the client communicatively coupled to the one or more processors, of the one or more inconsistencies.

10. The computer-implemented method of claim 8, wherein the new content is selected from the group consisting of: text, demo reel, film, manuscript, sketch, image, and design.

11. The computer-implemented method of claim 1, wherein each grouping of the plurality of groupings in the corpus comprises extracted entities with verified temporal contexts consistent with a defined geographic area.

12. The computer-implemented method of claim 1, wherein each grouping of the plurality of groupings in the corpus comprises extracted entities with verified temporal contexts consistent with a defined social group.

13. A computer program product comprising:
   a computer readable storage medium readable by one or more processors and storing instructions for execution by the one or more processors for performing a method comprising:
   ingesting, by the one or more processors, content from one or more sources of content and, for each source of the one or more sources of the content, one or more attributes comprising a verified temporal context of the source, wherein the verified temporal context attribute comprises an assurance that content associated with the verified temporal context attribute is consistent with date and time data associated with the content, wherein the assurance is based on an image in the content being consistent with the date and time data associated with the content;

cognitively analyzing, by the one or more processors, the content, by applying one or more entity recognition algorithm, to the content, to identify and extract entities in each source;

classifying, by the one or more processors, each extracted entity of the extracted entities in a given grouping of a plurality of groupings, wherein for each extracted entity, the classifying is based on at least one attribute of the one or more attributes comprising the verified temporal context of the source from which the extracted entity was extracted; and generating, by the one or more processors, a corpus comprising the plurality of groupings, wherein each grouping of the plurality of groupings in the corpus comprises extracted entities with verified temporal contexts consistent with a defined time period.

14. The computer program product of claim 13, wherein the one or more entity recognition algorithm is selected from the group consisting of: a visual recognition algorithm, an audio content and tone analysis algorithm, and a natural language understanding algorithm.

15. The computer program product of claim 13, wherein the one or more sources are selected from the group consisting of photographs, images, videos, audio recordings and text-based media.

16. The computer program product of claim 13, wherein one or more attributes comprising the verified temporal context for each source of the one or more sources of the content comprises an attribute selected from the group consisting of: a time attribute, a location attribute, and a cultural attribute.

17. The computer program product of claim 15, wherein the one or more entity recognition algorithm comprises the visual recognition algorithm and cognitively analyzing the content, by applying the one or more entity recognition algorithm comprises identifying and extracting entities comprising identifiers of objects, actions, scenes, and people visually represented in the content.

18. The computer program product of claim 13, the method further comprising:

ingesting, by one or more processors, new content, the new content comprising one or more attributes comprising an unverified temporal context of the new content;

cognitively analyzing, by the one or more processors, the new content, by applying one or more entity recognition algorithm, to the new content, to identify and extract entities in the new content;

classifying, by the one or more processors, the extracted entities from the new content into the given grouping, wherein the classifying is based on the unverified temporal context of the new content; and identifying, by the one or more processors, one or more inconsistencies between the extracted entities comprising the given grouping in the generated corpus and the extracted entities from the new content.

19. A system comprising:

a memory;

one or more processors in communication with the memory;

program instructions executable by the one or more processors via the memory to perform a method, the method comprising:

ingesting, by the one or more processors, content from one or more sources of content and, for each source of the one or more sources of the content, one or more attributes comprising a verified temporal context of the source, wherein the verified temporal context attribute comprises an assurance that content associated with the verified temporal context attribute is consistent with date and time data associated with the content, wherein the assurance is based on an image in the content being consistent with the date and time data associated with the content;

cognitively analyzing, by the one or more processors, the content, by applying one or more entity recognition algorithm, to the content, to identify and extract entities in each source;

classifying, by the one or more processors, each extracted entity of the extracted entities in a given grouping of a plurality of groupings, wherein for each extracted entity, the classifying is based on at least one attribute of the one or more attributes comprising the verified temporal context of the source from which the extracted entity was extracted; and generating, by the one or more processors, a corpus comprising the plurality of groupings, wherein each grouping of the plurality of groupings in the corpus comprises extracted entities with verified temporal contexts consistent with a defined time period.

20. The system of claim 19, the method further comprising:

ingesting, by one or more processors, new content, the new content comprising one or more attributes comprising an unverified temporal context of the new content;

cognitively analyzing, by the one or more processors, the new content, by applying one or more entity recognition algorithm, to the new content, to identify and extract entities in the new content;

classifying, by the one or more processors, the extracted entities from the new content into the given grouping, wherein the classifying is based on the unverified temporal context of the new content; and identifying, by the one or more processors, one or more inconsistencies between the extracted entities comprising the given grouping in the generated corpus and the extracted entities from the new content.

* * * * *